W. JONES.
Cultivator.
No. 215,931. Patented May 27, 1879.
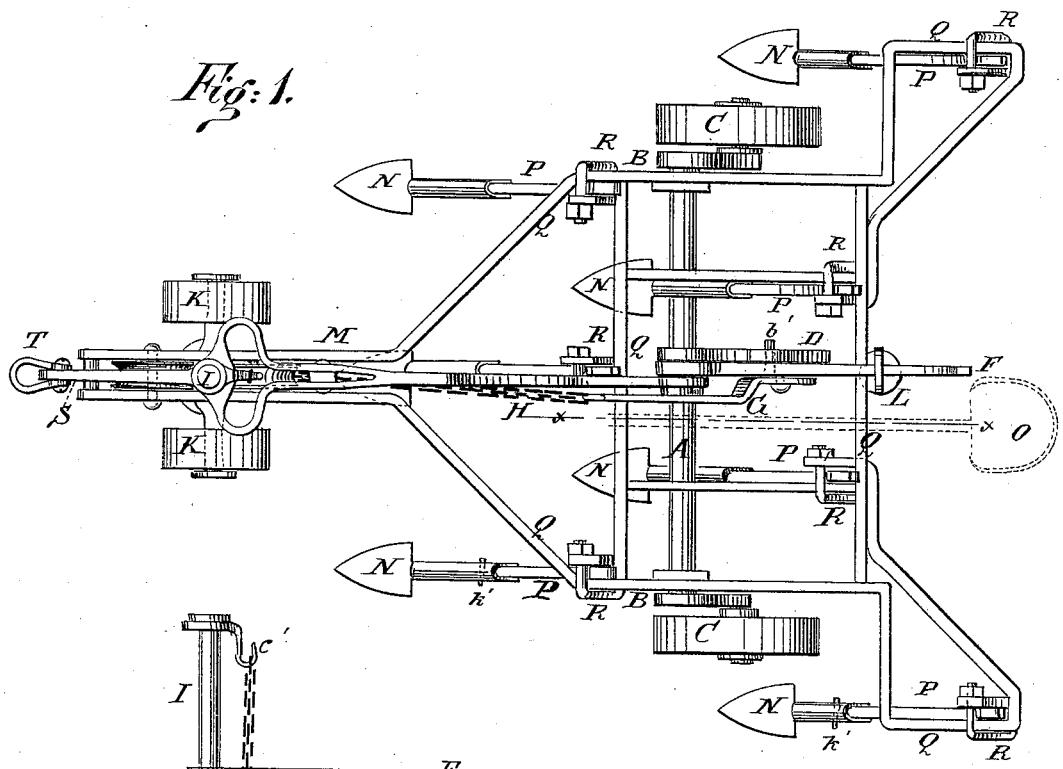
Fig: 1.
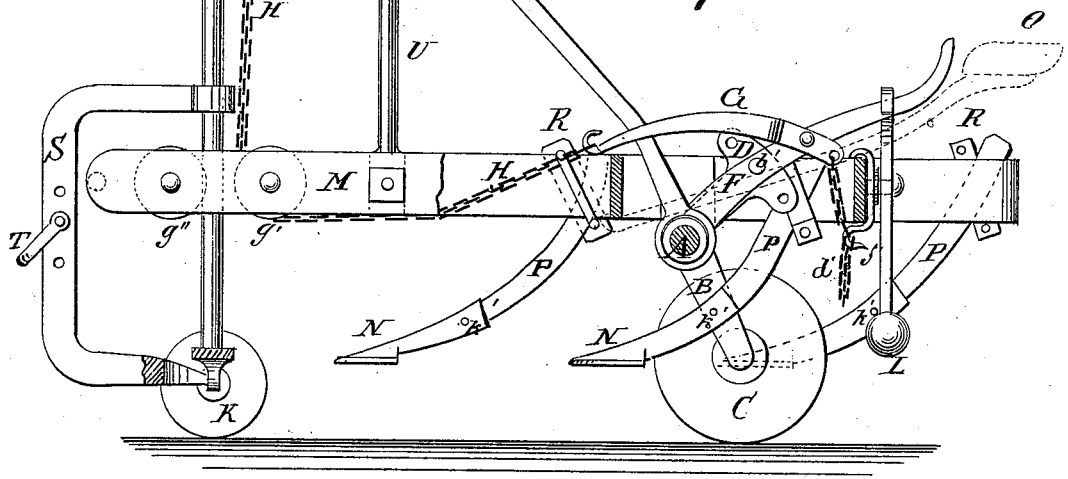
Fig: 2.
WITNESSES:
Chas. Nida
C. Sedgwick
INVENTOR:
W. Jones
BY
ATTORNEYS.

UNITED STATES PATENT OFFICE.

WILLIAM JONES, OF MILL POINT, NEW YORK.

IMPROVEMENT IN CULTIVATORS.

Specification forming part of Letters Patent No. 215,931, dated May 27, 1879; application filed March 27, 1879.

*To all whom it may concern:*

Be it known that I, WILLIAM JONES, of Mill Point, in the county of Montgomery and State of New York, have invented a new and Improved Cultivator, of which the following is a specification.

Figure 1 is a plan of the cultivator. Fig. 2 is a vertical longitudinal section on line $x\,x$.

Similar letters of reference indicate corresponding parts.

The object of this invention is to produce a cultivator that may be hauled or driven on the road on its own wheels—that is, constructed so that its teeth may be instantly elevated or depressed at will—and can cultivate or make a furrow close to a fence or hedge, and whose front axle can be swung nearly parallel with the tongue, to facilitate its short turning for a return furrow.

The invention consists of the axle A, which supports the body of the cultivator, and has secured to each end an eccentric or crank, B, provided with a pin that forms the journal of a wheel, C.

Upon the axle, and near its center, is immovably attached the link D, provided with two or more holes in its broad and free end. Fitted loosely upon the axle, close to link D, and between it and the brace or support E, is the lever F, whose angle of position is adjustable by means of the pin $b'$, that passes through its arm and into one of the holes in the link.

A little above the pin $b'$, and pivoted to the lever F, is the lever G, whose long arm is fashioned into a hook, to which is attached one end of the chain H, whose other end is held by the hook $c'$ on the head of the standard I, that turns in a collar formed in the end of the brace E, and whose lower end is stepped into the center of the axle that carries the forward wheels, K K. The brace E is further supported by the stanchion U.

The chain $d'$ connects the short arm of the lever G to the hook $f'$, that is fastened to one of the beams of the cultivator-frame, while from the same beam, and in close proximity, swings the weighted hook L, that serves to hold the lever F and its connections in position.

Between the two sides of the tongue M the pulleys $g'\,g''$ revolve, and it is seen that as the pulley $g'$ sits in the bight of the chain H the forward end of the cultivator is thereby supported.

When the lever F is in the position shown in Fig. 2, the cultivator-teeth N N are elevated from the ground, so that the cultivator may readily be hauled or driven on any road.

When the lever F is detached from the weighted hook and the chain $d'$ from the hook $f'$, the cultivator may be lowered to any desired level, and thus the depth of the furrows be regulated, and any level of adjustment between these two may be made.

The hook L is so adjusted and weighted that it will catch and hold the lever F at once when the driver or operator, who is seated in the seat O, presses it down.

The removable teeth N N are provided with sockets, which fit over the shanks P P, and they are held to the shanks by the pins $k'\,k'$. The shanks themselves are firmly secured to the beams $q\,q$ by the clips R R.

It will be observed that the two rearmost teeth extend outside of the wheels, and that this device enables the cultivator to cut or run a furrow close to a fence or hedge, and thereby bring under tillage much land that is usually left uncultivated; and it will be seen that the teeth can be removed for repair, or to be sharpened, or to be exchanged for others, by simply removing the pins $k'\,k'$.

Secured to the standard I and the axle of the front wheels is a large clevis or clamp, S, while adjustable at several points on the front of this is the smaller clevis T, to which the horse or team is attached for hauling the cultivator.

When a team is hitched directly to the tongue of a cultivator, as is usually the case, any irregularity in the motion of the team tends to cause the cultivator to make a crooked furrow; but by the combination of the revolving standard and the two clevises all such tendency is corrected, and the cultivator makes straight furrows at all times. Both the clevis S and the clevis T, however, may be dispensed with and a pole be attached in their stead to the tongue M.

Having thus described my invention, I claim as new and desire to secure by Letters Patent—

The combination, with the axle H, having crank at each end, provided with wheels C C, of the link D, having two or more holes at the free end, the brace E, the adjustable lever F, the lever G, having hook on long arm, the standard I, and the chain H, all arranged as shown and described.

WILLIAM JONES.

Witnesses:
 JAMES H. DOLSEN,
 HENRY JAMES BAILEY.